Patented Oct. 22, 1929

1,733,009

UNITED STATES PATENT OFFICE

ALPHONSE GAMS AND FRITZ LOCHER, OF BASEL, SWITZERLAND, ASSIGNORS TO FIRM OF SOCIETY OF CHEMICAL INDUSTRY IN BASLE, OF BASEL, SWITZERLAND

MANUFACTURE OF STEROLS

No Drawing. Application filed June 7, 1928, Serial No. 283,735, and in Switzerland June 14, 1927.

The present invention relates to an improved process for the manufacture of sterols, especially ergo-sterol, from fungi and especially from yeast.

It is known that yeast and other fungi, such as ergot, contain fats in which, besides fatty acids and their esters, there exist various sterols, particularly ergo-sterol and fungi sterol. No methods which could be applied technically have hitherto been described for isolating these sterols. The absence of such methods is more particularly of importance in the case of ergo-sterol which has recently acquired an enhanced therapeutic interest. The best method of isolation hitherto described (Zeitschrift für physiol. Chemie 124, 1923, page 10) consists in boiling the yeast with alcoholic potash solution but this only partially opens up the material, a considerable proportion of which remains as an insoluble residue which, in spite of troublesome further treatment (repeated boiling with alcohol and with ether) retains a considerable portion of the sterols present in the yeast. In any case, the yield of ergo-sterol by this method is technically insufficient.

By the present invention ergo-sterol and other sterols are obtained from yeast or other suitable fungi in technically sufficient yield by heating the material under pressure with a non-alcoholic aqueous solution of a compound of alkaline action, such as a hydroxide or carbonate soluble in water. In this manner the material treated can be completely dissolved and it is remarkable that the ergo-sterol which is otherwise very sensitive towards chemical and physical agencies remains unchanged.

The larger part of the sterols floats on the hydrolysis liquid and may be directly separated and worked up to pure sterols. The smaller part of the sterols remains in the hydrolysis liquid and may be extracted therefrom by means of an organic solvent not miscible with water, such as ether, chloroform, ethyl acetate or a hydrocarbon. Alternatively the whole hydrolysis mixture may be worked up to pure sterols in one operation by extraction with one of the above-named solvents.

The crude ergo-sterol obtained according to the invention is of a surprisingly high degree of purity so that after one or two recrystallizations from alcohol its melting point and optical rotation agree within the limits of error with those given by Tanret (Comptes rendus de l'Ac. des Sc. 147, [1908], page 75) for the pure ergo-sterol obtained from ergot. By the methods referred to in the introductory paragraph herein it is only possible to obtain a product agreeing with Tanret's product by conversion into the acetyl derivative.

The maximum yield of the best known process was 15 grams of ergo-sterol of melting point 154° C. from 10 kilos of press yeast. The process of this invention easily yields 30–40 grams of ergo-sterol of melting point 150–160° C. from kilos of press yeast.

The invention therefore at least doubles the yield of the known processes and also gives a purer product. Moreover, the process is one of great simplicity and cheapness.

The following example illustrates the invention:—

10 kilos of press yeast are saturated with a hot solution of 2 kilos of potassium hydroxide in 1 litre of water and the mass, after having been made homogeneous by mixing, is heated in an autoclave for several hours at about 120° C. The sterols separate on the surface of the dark brown liquid in the form of a pasty layer which is skimmed, and, after addition of some water, extracted by repeated shaking with ether. The united extracts are washed first with dilute caustic soda lye (about 1 per cent strength) and then with water until the latter shows a neutral reaction. The ethereal solution is dried by means of sodium sulfate, filtered and concentrated. After a large part of the ergo-sterol has crystallized while the solution is still warm (the volume being about 300–400 cc.) the solution is cooled for a short time to −10 to −15° C. or lower and the precipitate is then filtered and washed with equally cooled ether until the latter is no longer colored. In like manner the hydrolysis liquid may be extracted several times with ether to recover the sterols still contained therein and the ether extract may be worked up as described above.

In the first crystallization there were obtained in all 34.3 grams of pure white ergo-sterol of melting point 148–152° C. Obviously the extraction of the two phases may be conducted in one operation instead of separately.

By a single recrystallization from alcohol the aforesaid 34.3 grams of crude product yield 30.6 grams of pure ergo-sterol of melting point 159–160° C. $[\alpha]_D^{20} = -125.1°$ (in chloroform).

By fractional crystallization of the ethereal and alcoholic mother liquors still further quantities of ergo-sterol as well as of other sterols (for instance fungi sterol) are obtained.

The stated yields are not the maximum yields. In some cases 10 kilos of yeast have yielded 45 grams of crude ergo-sterol.

What we claim is:—

1. A process for obtaining sterols from fungi wherein the fungus is heated under pressure with a non-alcoholic aqueous solution of a substance of alkaline action and the sterols are separated from the mixture thus obtained.

2. A process for obtaining sterols from yeast wherein the yeast is heated under pressure with a non-alcoholic aqueous solution of a substance of alkaline action and the sterols are separated from the mixture thus obtained.

3. A process for obtaining ergo-sterol from fungi wherein the fungus is heated under pressure with a non-alcoholic aqueous solution of a substance of alkaline action and the ergo-sterol is separated from the mixture thus obtained.

4. A process for obtaining ergo-sterol from yeast wherein the yeast is heated under pressure with a non-alcohol aqueous solution of a substance of alkaline action and the ergo-sterol is separated from the mixture thus obtained.

5. A process for obtaining sterols from fungi wherein the fungus is heated under pressure with a non-alcoholic aqueous solution of an alkali hydroxide and the sterols are separated from the mixture thus obtained.

6. A process for obtaining sterols from yeast wherein the yeast is heated under pressure with a non-alcoholic aqueous solution of an alkali hydroxide and the sterols are separated from the mixture thus obtained.

7. A process for obtaining ergo-sterol from fungi wherein the fungus is heated under pressure with a non-alcoholic aqueous solution of an alkali hydroxide and the ergo-sterol is separated from the mixture thus obtained.

8. A process for obtaining ergo-sterol from yeast wherein the yeast is heated under pressure with a non-alcoholic aqueous solution of an alkali hydroxide and the ergo-sterol is separated from the mixture thus obtained.

In witness whereof we have hereunto signed our names this 26th day of May, 1928.

ALPHONSE GAMS.
FRITZ LOCHER.